United States Patent Office 2,715,123
Patented Aug. 9, 1955

2,715,123

METHOD FOR CONDUCTING THE AMADORI REARRANGEMENT OF N-GLYCOSIDES

John E. Hodge, Peoria, Ill., assignor to the United States of America as represented by the Secretary of Agriculture No Drawing. Application November 15, 1951,
Serial No. 256,587

16 Claims. (Cl. 260—211)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a novel method for accomplishing the structural rearrangement of amino derivatives of sugars. More particularly, it relates to a method for rearranging an N-glycoside of an aldose, transforming the sugar to a ketose derivative. The invention relates, in particular, to a novel method for conducting the Amadori rearrangement in the presence of novel agencies whereby the rearrangement is accomplished with relative ease and is accompanied by a minimum degree of side reactions, and whereby moreover, a novel class of chemical compounds can be formed.

In the Amadori rearrangement of N-glycosides, the following structural change occurs:

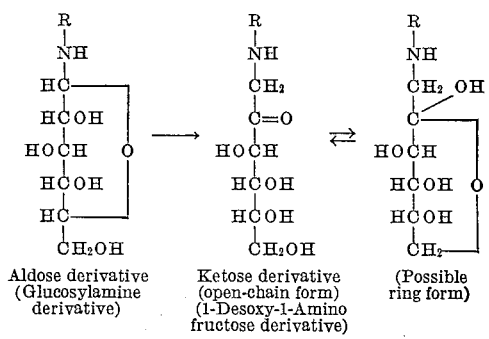

Aldose derivative (Glucosylamine derivative)  
Ketose derivative (open-chain form) (1-Desoxy-1-Aminofructose derivative)  
(Possible ring form)

In the case of the N-glucosides, the products may be termed 1-desoxy-1-amino-fructoses, which compounds have been called "isoglucosamines." In the formulas R may be an organic radical or hydrogen.

In German Patent No. 727,402, a procedure is described for carrying out the rearrangement to produce the foregoing structural change in sugar derivatives. The patent discloses the use of acids or acid-reacting salts to catalyze the rearrangement and to enable production of aryl "isoglycosamine" derivatives. The German method is restrictive in scope of application, however, for many derivatives of the N-glycoside class are easily hydrolyzed by acids. Efforts to effect the rearrangement for these labile compounds under acidic conditions have been unsuccessful. Thus, prior processes employing acidic catalysts have been restricted to glycosyl derivatives of primary aryl amines.

I have discovered that the Amadori rearrangement proceeds readily under non-acidic conditions in the presence of organic compounds which contain a hydrogen atom on the carbon in the alpha-position to an unsaturated linkage. The unsaturated linkage(s) may be ethylenic

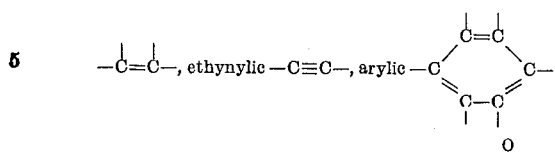

nitroso —N=O, imino —N=C—, and the like, or, in general, any electronegative radical. Examples of such active alpha-hydrogen atoms (shown by asterisk) are given by the following general formulas:

X may be C, N, S, P, As, Si, etc.  
R may be H or an organic radical

[A]                   [B]

where grouping A represents the general case, and grouping B represents the preferred case.

Examples of such preferred compounds are methyl malonate (1, R=CH₃), ethyl malonate (1, R=C₂H₅), acetylacetone (3), phenylacetone (4), ethyl acetoacetate, ethyl cyanoacetate, fluorene (5), and the like. One of the hydrogens of the methylene group may be substituted as in diethyl 2-methyl malonate (2).

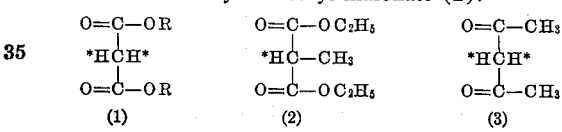

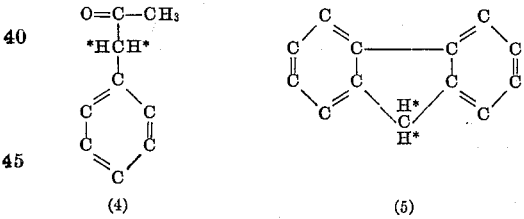

These compounds which I employ to assist in the rearrangement are employed in relatively large proportion, in the presence of a relatively small amount of secondary amine, such as piperidine, diethyl amine or dibenzyl amine. The compounds which furnish the activated environment, which I shall term for the sake of brevity "active methylene compounds," may comprise the reaction medium for the rearrangement, or the reaction may be carried out in an inert organic solvent, such as the lower alkanols, acetone, etc., in admixture with the active methylene compounds. The relative proportions of the two substances may vary over a wide range, the amount of active methylene compound consisting of at least 10 percent by volume of the mixture. In those instances where the active methylene compound possesses suitable physical characteristics, it may be used without the solvent component.

The amount of secondary amine is quite small, i. e., the proportion required being no greater than 5 percent of the medium. Lesser amounts, i. e., of the order of catalytic amounts, are preferred. However, in the case where the N-glycoside is a glycosyl derivative of a secondary amine, or if N-glycosides are formed in situ, as will be explained in detail below, the secondary amine may actually be the amine used in forming the N-glycoside. In that case, the presence of a different secondary amine to catalyze the rearrangement is unnecessary.

According to my novel process, employing a non-acidic environment, it is feasible to effect the rearrangement of N-glycosyl derivatives of both primary and secondary amines, and the amines need not be aryl in character. Moreover, the rearrangement of glycosyl derivatives of ammonia is also facilitated.

The rearrangement of N-glycosides by the Amadori rearrangement is of practical significance, for it effects the molecular rearrangement of an aldose sugar derivative to a ketone sugar derivative. Thus, D-glucose, as an amine derivative, can be converted to the corresponding amine derivative of D-fructose. The ketose sugar derivatives provide starting materials for a wide variety of chemical transformations leading to such products as riboflavin (vitamin $B_2$) and nucleic acids. In addition, the N-ketose derivatives obtained by my process possess an exceptionally strong reducing behavior characteristic of ene-diols. Thus, they may be used as antioxidants in alkaline environments. Moreover, the products of my process react readily with amino acids to convert them to aldehydes containing one less carbon atom than the original amino acid.

As previously stated, my process provides a method which includes effecting the Amadori rearrangement of N-glycosyl derivatives of secondary amines to produce novel products. The structural change occurring during the rearrangement may be represented by the following:

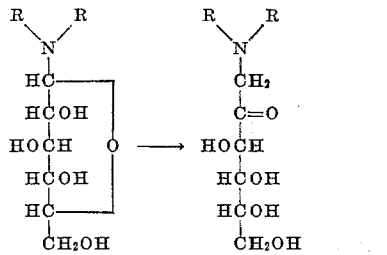

in which R may be the same or different organic radical, such as alkyl, aryl, or aralkyl. In addition, the two radicals R may be joined in a cycloaliphatic chain, such as in the piperidyl radical. The radicals R may be substituted by various radicals or substituents which are inert in the reaction medium.

Broadly speaking, this novel class of compounds is represented by the following formula

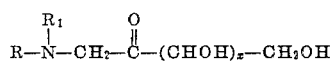

in which R represents an organic radical of the group consisting of alkyl, cycloalkyl, aryl, aralkyl; $R_1$ represents an organic radical, including R, and $x$ may be zero or a whole number, preferably less than 5.

The foregoing novel class of compounds are the Amadori rearrangement products of tertiary glycosyl amines. The term "glycosylamine" as used in this specification and claims refers to the class of glycosylamines in which the amino nitrogen may be unsubstituted or substituted by organic radicals.

The following specific examples illustrate the invention.

*Example 1*

This example illustrates typical conditions, according to my invention, for carrying out the Amadori rearrangement. In this example, illustrating the rearrangement of a glycosyl derivative of a secondary amine, the necessary catalytic amount of secondary amine is provided by the slight dissociation of the N-glycoside itself.

N-D-glucosylpiperidine [M. P. 130° C. (dec.); $[\alpha]_D^{25}+8.5°$, $c=5$, in pyridine] 50 g., was dissolved in boiling absolute ethanol, 100 ml., then hot ethyl malonate, 100 ml., was added. The resulting colorless, non-acidic solution was heated on a steam bath for two hours. During the heating period the color of the solution changed progressively through yellow, amber, orange, red-orange, and red-brown. To the final clear, red-brown solution was added acetone, 400 ml., and the mixture was allowed to stand four hours at 0° C. A white, crystalline product was obtained, 21.4 g. (43 percent), which melted with decomposition at 125°–126° C. The pure compound, melting at 127° C., was obtained by recrystallizing the product from absolute ethanol. $[\alpha]_D^{25}-57°$ ($c=2$, in water); $[\alpha]_D^{25}-115°$ (initial)→$-50°$ (constant after 24 hours, $c=2$, in pyridine).

Analysis: Calcd. for $C_{11}H_{21}O_5N$: C, 53.4%; H, 8.6%; N, 5.7%. Found: C, 53.5%; H, 8.5%; N, 5.7%.

Whereas N-D-glucosylpiperidine (I) in 0.1 N sodium hydroxide did not reduce and decolorize dichlorophenolindophenol solution, methylene blue, or Fehling solution at 25° C., the crystalline product obtained above did reduce and decolorize these solutions at 25° C. The strong reducing behavior of the product indicated it to be 1-desoxy-1-piperidino-D-fructose (II), an isomer of N-D-glucosylpiperidine (I). Furthermore, II formed an oxime derivative and a hydrazone derivative with hydroxylamine and phenylhydrazine, respectively, showing the presence of a carbonyl group in its structure, whereas (I) could not form such derivatives.

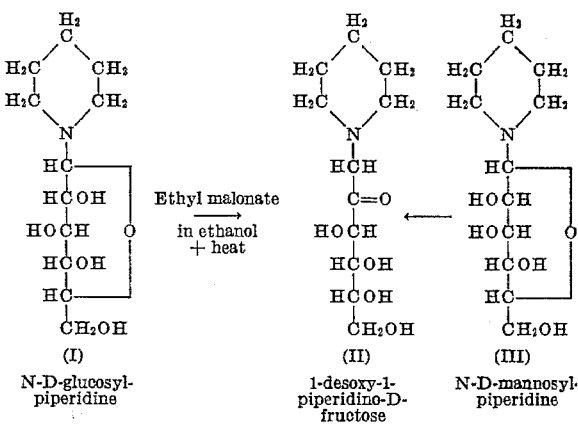

(I) N-D-glucosylpiperidine (II) 1-desoxy-1-piperidino-D-fructose (III) N-D-mannosylpiperidine

*Example 2*

This example shows that in the preparation of 1-desoxy-1-piperidino-D-fructose (II), D-glucose may be used as a starting material and that the intermediate compound, N-D-glucosylpiperidine, need not be isolated.

Finely powdered D-glucose, 5.0 g., and piperidine, 4.0 g. (1.7 moles per mole D-glucose) were mixed, stirred, and heated at 80° C. until a homogeneous, golden yellow sirup was obtained (10 minutes). The sirup was extracted once with ether (50 ml.) with vigorous stirring to remove most of the excess piperidine. A hot solution of ethanol (10 ml.) and ethyl malonate (15 ml.) was then added and the mixture was heated on a steam bath for 30 minutes. To the cool, red-brown solution was added ether (30 ml.) and, after standing at 0° C. for several days, 0.7 g. (10 percent of the amount theoretically possible) of glittering white crystals were obtained; M. P. 125°–126° C., identical in every way with the product of Example 1.

*Example 3*

This example shows that 1-desoxy-1-piperidino-D-fructose (II) may be produced from N-D-mannosylpiperidine (III) as well as from N-D-glucosylpiperidine (I).

N-D-mannosylpiperidine [M. P. 114° C.; $[\alpha]_D^{24}$

−28° → +24° (c=2, in pyridine)], 2.3 g., was dissolved in hot ethanol (12 ml.) and hot ethyl malonate (25 ml.) was added. The solution was heated one hour at 100° C., then cooled. Ether (75 ml.), added to the red-orange solution, produced a crystalline product, 0.5 g. (22 percent), which was identical in every property with the compound produced in Example 1.

*Example 4*

This example shows that acetylacetone may serve as an isomerizing agent, in the manner of ethyl malonate.

N-D-glucosylpiperidine, 10.0 g., was heated with 50 ml. absolute ethanol and 10 ml. acetylacetone for 90 minutes on the steam pot. The same color change as occurred in Example 1 was noted. The cooled solution was diluted with ether (250 ml.) and was kept at 2° C. for six hours. The crystalline product was isolated by filtration; yield 3.4 g. (34 percent), brilliant, right-angled flakes, M. P. 126°–127° C., identical in properties with 1-desoxy-1-piperidino-D-fructose (II).

*Example 5*

This example shows that phenylacetone is also an active agent for the Amadori rearrangement, in the manner of ethyl malonate and acetylacetone.

N-D-glucosylpiperidine, 6.0 g., in absolute ethanol (50 ml.) and phenylacetone (25 ml.) gave, after heating two hours at 80°–90° C., 2.4 g. (40 percent) of 1-desoxy-1-piperidino-D-fructose, M. P. 126° C. with decomposition.

*Example 6*

This example shows that diethyl 2-methyl-malonate may be used as an isomerizing agent for N-glycosides.

Into a hot mixture of 50 ml. absolute ethanol and 10 ml. diethyl 2-methyl malonate was dissolved N-D-glucosylpiperidine (10 g.). After one hour of heating on the steam bath, the cooled solution was diluted with ether yielding 4.9 g. (49 percent) of crude crystalline product. Recrystallized from ethanol-acetone, the pure compound melted at 127° C. with decomposition, and was identical with 1-desoxy-1-piperidino-D-fructose (II).

*Example 7*

This example shows that a glycosyl derivative of a primary arylamine can be rearranged to a ketose derivative according to this invention.

N-D-glucosyl-p-toluidine, 10.4 g., was shaken with 50 ml. of a solution composed of 3 parts absolute ethanol (by volume) to 2 parts ethyl malonate; then piperidine (0.5 ml.) was added. On heating, a homogeneous solution was obtained. After 90 minutes, the solution was a dark red-brown color; it was cooled and diluted with ether (150 ml.). The crystalline product which formed was filtered, washed with ethanol and ether, and dried; yield 5.5 g. (53 percent), M. P. 145°–148° C. with decomposition. Recrystallization from boiling ethanol (80 ml.) gave 3.9 g. white, needle crystals, M. P. 153°–154° (dec.); $[\alpha]_D^{25}$ −64° (initial) → −21° (final, c=1.1, in pyridine). The melting point and specific optical rotation show the product to be 1-desoxy-1-p-toluino-D-fructose (p-tolyl-D-isoglucosamine), a known compound.

*Example 8*

The two experiments described below show that 1-desoxy-1-dibenzylamino-D-fructose can be prepared starting from either D-glucose or D-mannose, using dimethyl malonate in methanol or diethyl malonate in ethanol as isomerizing agents. In each case, the secondary amine (dibenzylamine), being used in excess, serves as the necessary catalyst. These examples also show that the N-glycoside need not be isolated before isomerizing conditions are applied.

(a) Alpha-D-glucose, 4.4 g., and dibenzylamine, 7.0 g. (1.5 moles per mole of D-glucose), were heated in solution with methyl malonate (10 ml.) and methanol (50 ml.) for four hours. The solution was boiled on a steam bath under a reflux condenser. On cooling, crystallization occurred, and 4.5 g. (51 percent of the amount theoretically possible) of long, white needles, M. P. 161°–162° C. with decomposition, was isolated. This product was identical with that obtained in the experiment (b) below.

(b) D-mannose, 2.25 g., and dibenzylamine, 4.1 g. (1.5 moles per mole of D-mannose) were warmed together on a steam bath for 15 minutes. No reaction was apparent. A 1:1 solution of ethanol-ethyl malonate (10 ml.) was then added and heating was continued for 30 minutes. Crystallization occurred on cooling the mixture. The white, needle crystals were filtered, washed with ethanol and ether and dried; yield 1.85 g. (60 percent), M. P. 161°–162° C. with decomposition; $[\alpha]_D^{24}$ −89° (15 minutes) → −35° (7 days, c=0.8, in pyridine). When the compound was dissolved in 0.1 N sodium hydroxide in methanol at 25° C., it reduced and recolorized dichlorophenolindophenol solution, indicating it to be 1-desoxy-1-dibenzylamino-D-fructose.

*Example 9*

This example shows that a primary non-aryl amine-N-glucoside can be rearranged to a fructose derivative by means of my invention.

N-D-glucosylglycine ethyl ester, 10.0 g., was dissolved in a hot solution of absolute ethanol (75 ml.) and ethyl malonate (25 ml.). Two drops of piperidine were added as a catalyst. The solution was boiled under a reflux condenser for three hours. The color of the solution followed the same series of changes noted in Example 1. The final red-brown solution was concentrated in vacuo at 35°–40° C., leaving a sirup in ethyl malonate. The ethyl malonate was extracted with three additions of anhydrous ether. The sirup was then taken up in absolute ethanol and precipitated in ether, followed by recrystallization of the precipitate from hot dioxane. The product was a brown, hygroscopic powder, M. P. 70° C. with decomposition, showing approximately the same carbon, hydrogen, nitrogen, and ethoxyl analysis as the original N-D-glucosylglycine ethyl ester. The product reacted with one mole of hydroxylamine to form an oxime and reduced dichlorophenolindophenol solution in cold dilute alkali.

*Example 10*

This example shows that a secondary alkyl amine-N-glucoside can be rearranged to a fructose derivative in the presence of ethanol-ethyl malonate.

N-D-glucosyldiethanolamine [M. P. 128° C., $[\alpha]_D^{25}$ −23° (c=4, in pyridine)] 10.0 g., 1:1 ethanol-ethyl malonate (150 ml.), and diethanolamine (1 ml.) were heated in a flask attached to a reflux condenser. The mixture was boiled for three hours yielding a clear, red-orange solution. The solution was concentrated in vacuo at 50° C., leaving a viscous, red-brown sirup. The sirup was extracted twice with ether to remove residual ethyl malonate. When a portion of the sirup was dissolved in 0.1 N sodium hydroxide at 25° C., it reduced dichlorophenolindophenol solution rapidly, indicating formation of 1-desoxy-1-diethanolamino-D-fructose. Further evidence for the formation of a ketose derivative was the isolation of a crystalline phenyl hydrazone derivative after reaction of the sirupy product with phenylhydrazine.

*Example 11*

This example consists of a series of experiments which show that acidic catalysts, such as those claimed in German Patent No. 727,402 are not effective in producing 1-desoxy-1-piperidino-D-fructose from N-D-glucosylpiperidine. In the experiments below, the success of malonic acid, in contrast to the failures of succinic acid and oxalic acid, indicates that it is the active hydrogen on α-carbon atom of malonic acid that forms the necessary condition for the rearrangement of N-D-glucosylpiperidine.

D-glucose, 10 g., and piperidine, 6.5 g. (1.4 moles per mole D-glucose), were mixed and heated on a steam bath for 10 minutes. This procedure had previously been demonstrated to yield N-D-glucosylpiperidine. Without isolating the N-glucoside, ethanol (20 ml.) was added and each of the following were tried in parallel experiments as isomerizing agents: (1) 4 N hydrochloric acid, 0.5 ml.; (2) 4 N sulfuric acid, 0.5 ml.; (3) benzoic acid, 1.6 g.; (4) oxalic acid, 1.0 g.; (5) succinic acid, 2.0 g.; (6) malonic acid, 1.5 g. Each reaction mixture was heated 30 minutes in a steam bath, then ether was added to the point of incipient turbidity. Seed crystals of 1-desoxy-1-piperidino-D-fructose were then added, and the flasks were set aside in the refrigerator for crystallization. In the first five cases, no yield of the expected product was obtained; but in the case of malonic acid, 1-desoxy-1-piperidino-D-fructose was isolated in 17 percent of the theoretical yield.

I claim:

1. The method comprising subjecting a glycosylamine to the presence of an active methylene compound which possesses an active hydrogen atom linked to a carbon atom in the alpha position to an unsaturated linkage in a non-acid reaction medium in the presence of a secondary amine thereby to effect the structural rearrangement of said glycosylamine from aldose to ketose form.

2. The method of claim 1 in which the glycosylamine is formed in situ by the interaction of an aldose sugar and an organic amine.

3. The method of claim 2 in which the organic amine is a secondary amine.

4. The method of claim 1 in which the glycosylamine is N-D-glucosylpiperidine.

5. The method of claim 4 in which the active methylene compound is ethyl malonate.

6. The method of claim 1 in which the glycosylamine is N-D-glucosyl-p-toluidine.

7. The method of claim 6 in which the active methylene compound is ethyl malonate.

8. The method comprising heating alpha-D-glucose and dibenzylamine in a reaction medium comprising methyl malonate thereby to effect the Amadori rearrangement reaction, and recovering 1-desoxy-1-dibenzylamino-D-fructose from the reaction medium.

9. The method comprising heating D-mannose and dibenzyl amine in a reaction medium comprising ethyl malonate thereby to effect the Amadori rearrangement reaction, and recovering 1-desoxy-1-dibenzylamino-D-fructose from the reaction medium.

10. The method comprising heating D-glucose and piperidine to form a reaction mixture comprising a glycosylamine compound and then heating the reaction mixture in a reaction medium comprising ethyl malonate thereby to effect the Amadori rearrangement reaction and recovering 1-desoxy-1-piperidine-D-fructose therefrom.

12. The method of claim 4 in which the active methylene compound is acetylacetone.

12. The method of claim 4 in which the active methylene compound is phenylacetone.

13. The method comprising heating N-D-glucosylglycine ethyl ester in a reaction medium comprising ethyl malonate in the presence of piperidine, thereby to effect the Amadori rearrangement reaction, and recovering said rearranged product from the reaction mixture.

14. The method comprising heating N-D-glucosyldiethanolamine in a reaction mixture comprising ethyl malonate in the presence of diethanolamine, thereby to effect the Amadori rearrangement reaction, and recovering 1-desoxy-1-diethanolamine-D-fructose from the reaction mixture.

15. A method for effecting the structural rearrangement of glycosylamines comprising heating a glycosylamine in a reaction medium in the presence of a secondary amine, said reaction medium comprising a compound which possesses an active hydrogen atom linked to a carbon in the alpha position to two unsaturated linkages.

16. The method comprising subjecting a glycosylamine to the presence of an active methylene compound which possesses an active hydrogen atom linked to a carbon atom in the alpha position to two unsaturated linkages in a non-acid reaction medium in the presence of a secondary amine thereby to effect the structural rearrangement of said glycosylamine from the aldose to the ketose form.

References Cited in the file of this patent

UNITED STATES PATENTS 2,354,846   Weygand _____ Aug. 1, 1944

OTHER REFERENCES

Weygand, Berichte U. 73 (1940), pgs. 1266, 1269.